United States Patent
Wang

(10) Patent No.: US 7,207,228 B2
(45) Date of Patent: Apr. 24, 2007

(54) TRACER AIRFLOW MEASUREMENT SYSTEM (TRAMS)

(75) Inventor: Duo Wang, Albany, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/917,161

(22) Filed: Aug. 11, 2004

(65) Prior Publication Data

US 2005/0034533 A1  Feb. 17, 2005

Related U.S. Application Data

(60) Provisional application No. 60/494,436, filed on Aug. 11, 2003.

(51) Int. Cl.
*G01F 1/704* (2006.01)
(52) U.S. Cl. .................................. 73/861.07
(58) Field of Classification Search ............. 73/861.95, 73/861.07; 361/687; 123/41.63; 340/825.22; 310/58
See application file for complete search history.

(56) References Cited

U.S. PATENT DOCUMENTS 4,167,870 A * 9/1979 Haas ........................ 73/861.04
5,189,412 A * 2/1993 Mehta et al. ........... 340/825.22
6,031,717 A * 2/2000 Baddour et al. ............ 361/687
6,928,963 B2 * 8/2005 Karanik .................... 123/41.63
6,933,634 B2 * 8/2005 Frank et al. ................... 310/58

OTHER PUBLICATIONS

M. Brook, "California Electricity Data with Details on Commercial Building HVAC Systems," Presentation PIER Buildings Program HVAC Diagnostics Meeting, (Oakland, CA), p. 1-13, (Apr. 16, 2002).
Smacna, HVAC Air Duct Leakage Test Manual, 1st ed., Sheet Metal and Air Conditioning Contractors' National Association, Inc. (Lafayette, CA), p. 1-74, (Jan. 10, 1985).
M. Rufo, F. Coito, "California Statewide Commercial Sector Energy Sector Efficiency Potential Study", Final Report.of XENERGY Inc., Regional Economic Research Inc., Quantum Consulting Inc., Energy Solutions Inc. to PG&E (San Francisco, CA), p. 1-126, (Jul. 9, 2002).
Tengfang Xu et al., "Commercial Thermal Distribution Systems Final Report for CIEE/CEC", No. 44320, LBNL (Berkeley, CA), p. 1-293, (Dec. 1, 1999).

(Continued)

*Primary Examiner*—Jewel V. Thompson
(74) *Attorney, Agent, or Firm*—Joseph R. Milner

(57) ABSTRACT

A method and apparatus for measuring fluid flow in a duct is disclosed. The invention uses a novel high velocity tracer injector system, an optional insertable folding mixing fan for homogenizing the tracer within the duct bulk fluid flow, and a perforated hose sampling system. A preferred embodiment uses $CO_2$ as a tracer gas for measuring air flow in commercial and/or residential ducts. In extant commercial buildings, ducts not readily accessible by hanging ceilings may be drilled with readily plugged small diameter holes to allow for injection, optional mixing where desired using a novel insertable foldable mixing fan, and sampling hose.

22 Claims, 8 Drawing Sheets

OTHER PUBLICATIONS

EIA, 1999 Commercial Buildings Energy Consumption Survey-Detailed Tables, Energy Information Administration, US Department of Energy (USA), p. 1-5, (May 21, 2002).

Richard Rohrer, California Energy Demand 2000-2010, California Energy Commission Report P200-00-002 (Sacramento, CA), p. 1-90, (Jun. 1, 2002).

Duo Wang, "TRAMS: A New Tracer Gas Airflow Measurement System", Environmental Energy Technologies Division News, LBNL (Berkeley, CA), vol. 5 (No. 3), p. 7,11, (Jun. 21, 2004).

R. Diamond, C. Wray, D. Dickerhoff, N. Matson, D. Wang, Thermal Distribution Systems in Commercial Buildings, LBNL Report No. 51860 (Berkeley, CA), p. 1-85, (May 1, 2003).

* cited by examiner

Tracer-gas Airflow Measurement Analysis

Tracer-gas Airflow Measurement Analysis

TRACER AIRFLOW MEASUREMENT SYSTEM (TRAMS)

CROSS REFERENCE TO RELATED APPLICATIONS

This application claims priority to U.S. Provisional Patent Application No. 60/494,436, filed Aug. 11, 2003 entitled "Tracer-Gas Airflow Measurement System", which is hereby incorporated by reference in its entirety.

STATEMENT REGARDING FEDERAL FUNDING

This invention was made with U.S. Government support under Contract Number DE-AC03-76SF00098 between the U.S. Department of Energy and The Regents of the University of California for the management and operation of the Lawrence Berkeley National Laboratory. The U.S. Government has certain rights in this invention.

REFERENCE TO A COMPUTER PROGRAM

Not applicable.

BACKGROUND OF THE INVENTION

1. Field of the Invention

The present invention pertains generally to methods used in the measurement of gas flow rates (flux), more particularly to the measurement of airflow, and still more particularly to the measurement of airflow in ducts.

2. Description of the Relevant Art

"Thermal Distribution Systems in Commercial Buildings", authored by Rick Diamond, Craig Wray, Darryl Dickerhoff, Nance Matson, and Duo Wang, Lawrence Berkeley National Laboratory Berkeley, Calif., Report Number 51860, May 2003, incorporated herein by reference, describes the challenges and issues facing the quantification of the efficiencies of building thermal distribution systems, (the "Diamond" report). As one example, it states that a 15% leakage in the duct distribution system results in a 25–35% increase in fan power. It does not mention the increased costs associated with the conditioning of the leakage flow.

There is need for a relatively low cost duct loss measurement system that is minimally invasive in existing commercial and residential buildings. Such a measurement system may be used in conjunction with duct sealing systems, such as described in patent publication US 2003-0138558 A1, entitled "Method and apparatus for duct sealing using a clog-resistant insertable injector", which is hereby incorporated by reference in its entirety.

BRIEF SUMMARY OF THE INVENTION

In one embodiment, this invention provides for a method for measuring fluid flow, the method comprising the steps of: a) injecting an amount of a tracer into a bulk fluid flow, said flow having an upstream and downstream; b) detecting a concentration of the injected flow tracer at a distance downstream; and c) calculating the bulk fluid flow from the injected tracer amount and the detected tracer concentration.

The measurement method described above may further comprise the step of mixing the bulk fluid flow and tracer with an insertable foldable mixing fan. The insertable foldable mixing fan will preferably either have a fan speed controller, or a rate-limiting rotational acceleration, whereby said fan speed may be increased at a rate below that of damaging the insertable foldable mixing fan.

The measurement method detecting step described above may further comprise: a) inserting a perforated sampler hose into said bulk fluid flow and tracer mixture; and b) sampling said perforated sampler hose to detect said concentration of injected flow tracer.

The perforated sampler hose above may be selected from a group consisting of: a section of soaker hose, a section of Gore-Tex stretched Teflon tubing, a laser perforated hose, a mechanically perforated hose, and an injection molded perforated hose. The perforated sampler hose may have a cross section is selected from a group consisting of: round, oval, rectangular, triangular, quadrilateral, and irregular.

The bulk fluid may be air (most commonly), a gas, or a liquid.

The fluid flow rate measurement method calculating step may comprise:

$$\text{integrating } Q_{bulk}^{ave} = \frac{m_{tracer}}{\rho_{tracer} \int_0^T (C^{down} - C^{up}) dt}$$

for the average bulk fluid flow $Q_{bulk}^{ave}$ given:
said tracer mass injected $m_{tracer}$,
said tracer density $\rho_{tracer}$,
a sample time T,
a set of samples of detected downstream concentrations $C^{down}$,
a set of samples of detected upstream concentrations $C^{up}$.

The fluid flow rate measurement method injecting step may further comprise measuring the mass flow rate of tracer injection.

Alternatively, the fluid flow rate measurement method injecting step may further comprise controlling the mass flow rate of tracer injection.

The injector system performing the injecting step described above, may comprise: a) a pressurized tracer gas source; b) a valve connected to said gas source; c) one or more flexible tubes having a distal and proximal end, said proximal end connected to said valve; and d) a smaller diameter tube in the distal end of each flexible tube, e) whereby said pressurized gas flows from the gas source, through the valve, through one or more flexible tubes, and through the smaller diameter tube, to exit the smaller diameter tube.

The injecting step described above may further comprise homogenizing said bulk fluid with said tracer to an essentially well-mixed state.

The tracer may be selected from the group consisting of: carbon dioxide, water vapor, argon, xenon, helium, and sulfur hexafluoride.

In another embodiment, this invention provides for a method of measuring air flow in ducts comprising: a) detecting an initial concentration of carbon dioxide in an upstream portion of a duct, said duct having an air flow; b) injecting a known amount of carbon dioxide into said upstream portion of said duct for a period of time; c) detecting a downstream rise of concentration of carbon dioxide in said duct (over any initial background concentration); and d) means for calculating said air flow using said initial concentration, said known amount and said downstream concentration.

In the method of measuring air flow in ducts method above, said means for calculating may be a computer. The detecting step may be achieved by an environmental gas analyzer, a residual gas analyzer, or a mass spectrometer.

In the method of measuring air flow in ducts method above, said injecting step may further comprise: a) inserting an injector into said duct; and b) releasing pressurized carbon dioxide at high velocity one or more ends of compliant distribution tubes movement-contained by said duct.

An apparatus may be constructed for performing the duct air flow measurement methods described above, comprising: a) an injector performing the injecting step; b) a detector performing the detecting step; and c) a computer connected to said detector performing said means for calculating.

In yet another embodiment, this invention provides for a device for air flow measurement in a duct comprising: a) a means for injecting a tracer gas into a duct; b) a means for measuring tracer gas concentration in said duct; c) a means for calculating airflow in said duct using said injecting means and said measuring means.

BRIEF DESCRIPTION OF THE SEVERAL VIEWS OF THE DRAWINGS

The invention will be more fully understood by reference to the following drawings, which are for illustrative purposes only.

DETAILED DESCRIPTION OF THE PREFERRED EMBODIMENT

Defined Terms

Figure 1A:
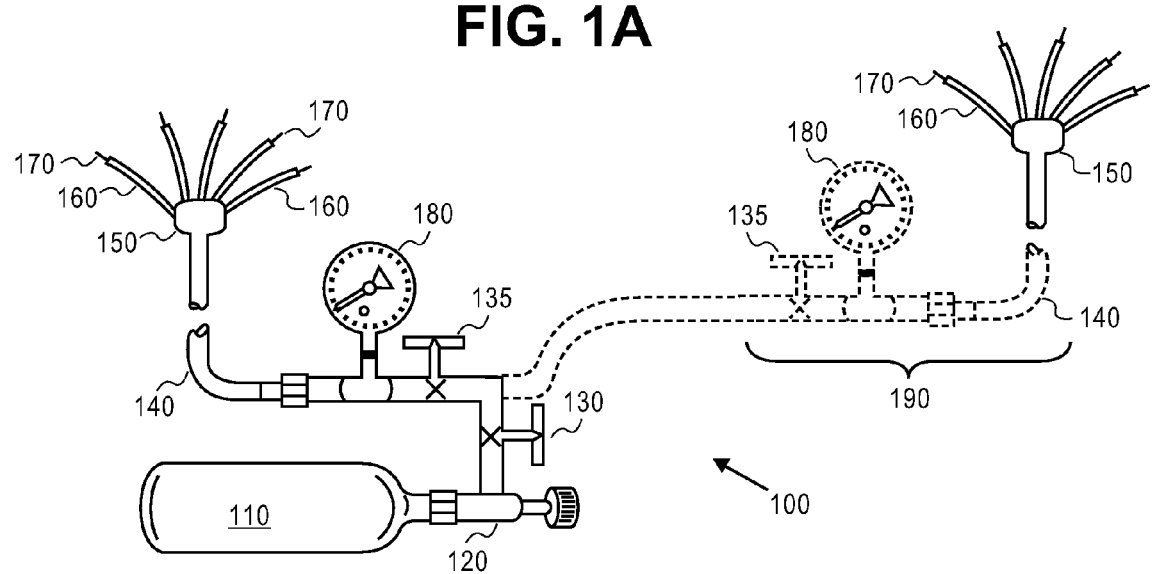
FIG. 1A is a schematic drawing of a tracer gas injection system, including a pressurized tracer gas bottle, injection control valves, pressure gage, flexible injector lines, and hypodermic-style injectors.

Computer means any device capable of performing the steps developed in this invention to result in an optimal duct fluid flow rate measurement, including but not limited to: a microprocessor, a digital state machine, a field programmable gate array (FGPA), a digital signal processor, a collocated integrated memory system with microprocessor and analog or digital output device, a distributed memory system with microprocessor and analog or digital output device connected with digital or analog signal protocols.

Computer readable media means any source of organized information that may be processed by a computer to perform the steps developed in this invention to result in an optimal waterflood injection, including but not limited to: a magnetically readable storage system; optically readable storage media such as punch cards or printed matter readable by direct methods or methods of optical character recognition; other optical storage media such as a compact disc (CD), a digital versatile disc (DVD), a rewritable CD and/or DVD; electrically readable media such as programmable read only memories (PROMs), electrically erasable programmable read only memories (EEPROMs), field programmable gate arrays (FGPAs), flash random access memory (flash RAM); and remotely transmitted information by electromagnetic or optical methods.

Introduction

Duct leakage has been identified as a major source of energy loss in large commercial buildings. It is often very difficult to accurately measure the leakage and quantify the results. The current measuring standards use a duct pressurization technique; however, the technique fails to give accurate measurements of duct leakage flow rates. Diamond identified a better duct leakage screening technique using thermal distribution systems The rationale for developing this invention was to detect duct leakage flow, which, as a result, has a range of applications, including: airflow balancing in building HVAC (heating, ventilation, air conditioning) systems, HVAC diagnostics, and calibration of in-place airflow measurement stations, each of which this invention may address.

The technologies currently available to measure flow rates of gases (typically air) in duct systems within buildings require careful use and substantial time to produce accurate measurements. The traditional measurement systems use Pitot-static tubes, hot-wire anemometers or other anemometers to measure velocities at several locations in the cross section of a duct air stream. Problems such as low air velocities near the detection limit of the anemometers, and large spatial variability in air velocities make it very difficult to accurately measure air flow rates using these methods.

Researchers have, in the past, sometimes used tracer gas methods to measure air flow rates in ducts. If a tracer gas is injected into a duct at a known rate, and the true average concentration of tracer gas upstream and down-stream of the injection plane may be determined, with the flow rate is calculated from a simple mass balance equation. However, the limitations of poor mixing of the tracer gas in the air stream, the high cost of tracer gas analysis systems, and the substantial time required to perform measurements in situ within extant structures have severely limited the application of these methods.

The basis of the new technique described herein is to measure the airflow into and out of the ventilation system, where the difference between the two flows is leakage. Highly accurate laboratory equipment is available to make airflow rate measurements, however, such systems are time consuming to install and would require sections of duct be removed. As it is quite costly and invasive to insert such equipment into extant buildings, using these devices is generally impractical, or much too expensive, for in situ building duct flow leakage measurements. Diamond also identified a commercially available flow hood that could quickly and accurately measure the flow leaving registers along a duct, however, there is no system for measuring the intake flow for an in situ duct with high accuracy.

The invention described herein accurately measures the intake flows from several hundred to 5000 cubic feet per minute (cfm) or higher in large commercial buildings by using a tracer gas. By modifying the tracer gas input flow rate, flows ranging from 1–10, 10–100, 100–1000, 1000–10000, 10000–100000 cfm would be possible. A tracer gas is an easily measurable gas that can be readily detected in minute quantities. A few tracer gasses that can be used for duct flow measurements include, but are not limited to: nitrous oxide ($N_2O$), carbon dioxide ($CO_2$), and sulfur hexafluoride ($SF_6$). Still other gases include Ar, Xe, $H_2O$ vapor in heated or warm ducts where condensation is not likely to disrupt the measurement methods described herein. At greater expense, however, isotopes, or isotopically enhanced gaseous compounds may be used.

Typically, each tracer gas has advantages and disadvantages, but some outweigh the others. Nitrous oxide $N_2O$ can form explosive mixtures in air, sulfur hexafluoride $SF_6$ requires prohibitively expensive gas-analyzers, and carbon dioxide has a high background concentration and is produced by occupants during ordinary respiration and other activities. $CO_2$ was selected for this project due to several important factors; it is low cost, non-toxic and the concentration can be determined to a high level of accuracy using affordable gas-analyzers. The $CO_2$ concentration was measured using an infrared gas analyzer. Using a mass balance equation from fluid dynamics, a duct airflow rate may be determined by using a tracer gas injection rate and a measured tracer gas concentration, as further developed below. While the tracer gas injection rate may be measured with a mass-flow controller, a simpler method using a time integration method was developed. For simplicity's sake, we have chosen here as an example $CO_2$ as the tracer gas, and hereinafter reference $CO_2$ exclusively for the discussion and experimental results shown below. It should be understood, that by substitution of another tracer gas, the analytical development remains the same for another chemically non-reactive tracer gas, so long as the tracer gas does not sublimate, condense, or react, and so long as the flow of the tracer gas into a duct under test minus the flow of tracer gas leakage (through duct leaks) is equal to the flow of tracer gas out of the duct under test.

This invention addresses the issue mixing the gaseous $CO_2$ tracer gas with the air stream flowing through the duct to form a homogenous mixture. The $CO_2$ tracer gas needs to be completely mixed with the air in the duct to ensure that accurate concentration measurements representative of the bulk flow are made. Many different injector configurations were tried before an effective $CO_2$ tracer gas injector was found. One such injector was made by using hypodermic needles, or other thin-walled small diameter, essentially rigid, tubes, to which thin flexible tubes were attached. The hypodermic needles provided the small size exit orifice required for high nozzle exit velocities, and hence duct injection, and the tiny flexible tubes tend to whip about in the duct at a high velocity in an random fashion that appears to experimentally insure good mixing.

The relative high velocity tracer gas injection is though to induce turbulent eddy vortex mixing of the tracer gas with the bulk gas flow (typically air) in the duct. The dual effects of high injection velocity coupled with the rapid random movement of the injection point (at the exit orifice) within the cross-section of the duct appears to ensure a uniform distribution of the tracer gas within the bulk flow as measured downstream. Note, however, that the flows are still of varying velocities across the cross-section of a duct, even though the proportion of tracer gas in the bulk flow is essentially evenly mixed. Laboratory tests were conducted using a sample duct with such injection method to test the resultant tracer gas—air mixing, and to perform bulk gas flow rate measurements.

The injector system and insertable foldable mixing fan described herein are minimally intrusive when compared to demolition and repair of walls, ceilings and floors for duct access: each injector requires only a ¼ inch diameter hole through the duct, and each mixing fan only requires a ¾ inch diameter hole.

Tracer-Gas Airflow Measurement Theory

The basic theory behind the tracer-gas measurement technique comes from the fundamental mass balance equation:

$$\dot{m}_{CO_2}^{up} + \dot{m}_{CO_2}^{in} = \dot{m}_{CO_2}^{down} \qquad (1)$$

Where $\dot{m}_{CO_2}^{up}$ is the mass flow rate of $CO_2$ upstream of the injection point, $\dot{m}_{CO_2}^{in}$ is the mass flow rate of the injected $CO_2$, and $\dot{m}_{CO_2}^{down}$ is the $CO_2$ mass flow rate downstream of the injection. In this case the dotted $\dot{m}$ nomenclature refers to the derivative of mass with respect to time $$\frac{dm}{dt},$$

and may be loosely interchangeably referred to as the flow, flow rate, or mass flow rate, using traditional engineering notions of fluid dynamics. Equation (1) may be rewritten to an equivalent volumetric flow rate form of the equation where $\dot{m}=\rho \cdot Q$ ($\dot{m}$ is the mass flow rate, $\rho$ the density, and Q the volumetric flow rate) and switching the working fluid to air:

$$\rho_{CO_2} \cdot Q_{air} \cdot C^{up} + \dot{m}_{CO_2}^{in} = \rho_{CO_2} \cdot Q_{air} \cdot C^{down} \qquad (2)$$

Where $\rho_{CO_2}$ is the density of $CO_2$, Q is the volumetric flow rate (typically referred to in cubic feet per minute, or cfm at standard or operating conditions) and C is the volumetric concentration of $CO_2$, which could range from 0–100%, but typically ranges below a few percent in typical testing of air flows. Where normal tracer gas flows are injected causing a 100–1000 ppm concentration increase in the bulk gas, the volumetric flow rate of $CO_2$ may be neglected for the sake of simplicity in the right-hand side of Equation 2 due to its (designed) very small contribution to the total flow in this application. Typically, the $CO_2$ concentration will be increased by approximately 500 parts per million (ppm), which is 0.05% of the total airflow. Such a small percentage of the bulk gas volumetric flow rate should cause an error on the order of the same magnitude of 0.05%. The volumetric airflow rate $Q_{air}$ for the duct may be solved for directly in Equation (2), yielding:

$$Q_{air} = \frac{\dot{m}_{CO_2}^{in}}{\rho_{CO_2} \cdot (C^{down} - C^{up})} \quad (3)$$

Equation 3 may be used for instantaneous flow measurements, where the mass flow rate of $CO_2$, $\dot{m}_{CO_2}^{in}$ is known, such as by using a mass flow controller.

By integrating Equation (2) as a function of time and rearranging, the volumetric airflow rate may be determined without knowing the instantaneous injection rate, introducing the new terminology of $Q_{air}^{up}$ and $Q_{air}^{down}$ to represent the air flow rates upstream and downstream of the injection point, respectively.

$$\int_0^T \rho_{CO_2} \cdot Q_{air}^{up} \cdot C^{up}(t) dt + \int_0^T \dot{m}_{CO_2}^{in}(t) dt = \quad (4)$$
$$\int_0^T \rho_{CO_2} \cdot Q_{air}^{down} \cdot C^{down}(t) dt$$

Assuming a constant $Q_{air}^{ave}$ over the time period of integration, using a constant $\rho_{CO_2}$, and rewriting the two C(t) notations as just C upstream and downstream of the tracer gas injection point, respectively $C^{up}$ and $C^{down}$, and dividing by $\rho_{CO_2}$ produces:

$$Q_{air}^{ave} \cdot \int_0^T C^{up} dt + \frac{1}{\rho_{CO_2}} \int_0^T \dot{m}_{CO_2} dt = Q_{air}^{ave} \int_0^T C^{down} dt \quad (5)$$

Note that, in Equation (5), $$\int_0^T \dot{m}_{CO_2} dt$$

is simply the mass of $CO_2$ injected, $m_{CO_2}$, therefore solving for $Q_{air}^{ave}$ yields:

$$Q_{air}^{ave} = \frac{m_{CO_2}}{\rho_{CO_2} \int_0^T (C^{down} - C^{up}) dt} \quad (6)$$

By averaging in Equation (6) the concentration over time, $$Q_{air}^{ave} = \frac{m_{CO_2}}{\rho_{CO_2} \cdot T \cdot \Delta C_{ave}} \quad (7)$$

Where $\Delta C_{ave}$ is the average change in concentration, $$\int_0^T (C^{down} - C^{up}) dt,$$

and T is the total integration time period where the tracer gas flow is increased over the background concentration of the tracer gas, if present.

Equations (6) and (7) demonstrate the elegance of the integration method. If both the up and down stream concentrations were known at all times, then it would be much simpler to solve for Q. The upstream concentration will not be known, however, so the upstream concentration during injection will be estimated to change linearly:

$$C^{up} = C^{pre} + t \cdot \frac{(C^{post} - C^{pre})}{T} \quad (8)$$

Where $C^{pre}$ is the $CO_2$ concentration before injection, $C^{post}$ is the concentration after injection, and t is the variable for time. The change in concentration becomes, $$\int_0^T (C^{down} - C^{up}) dt = \int_0^T \left( C^{down} - C^{pre} - t \cdot \frac{(C^{post} - C^{pre})}{T} \right) dt \quad (9)$$

By using the trapezoid formula to numerically integrate Equation (9) over n segments, and where i=1 . . . n, we obtain:

$$= \frac{T}{n} \cdot \frac{1}{2} \sum_{i=1}^n \left\{ \left[ C_{i-1}^{down} - C^{pre} - \frac{i-1}{n}(C^{post} - C^{pre}) \right] + \left[ C_i^{down} - C^{pre} - \frac{i}{n}(C^{post} - C^{pre}) \right] \right\} \quad (10)$$

$$= T \left[ \frac{1}{2n} \sum_{i=1}^n (C_{i-1}^{down} + C_i^{down}) - \frac{C^{post} + C^{pre}}{2} \right] \quad (11)$$

If the pre- and post-background concentrations (respectively $C^{pre}$ and $C^{post}$) are assumed to be constant and averaged, then:

$$T \cdot \Delta C_{ave} = T \left[ \frac{1}{2n} \sum_{i=1}^n (C_{i-1}^{down} + C_i^{down}) - \frac{1}{2} \left( \frac{1}{m} \sum_{j=1}^m C_j^{pre} + \frac{1}{L} \sum_{k=1}^L C_k^{post} \right) \right] \quad (12)$$

Finally, one may solve for $Q_{air}$ by substituting Equation (12) into Equation (7), the bulk airflow rate at standard conditions with concentrations measured in ppm is:

$$Q_{air} = \frac{m_{CO_2} \cdot 10^6}{\rho_{CO_2} \cdot T \left[ \frac{1}{2n} \sum_{i=1}^n (C_{i-1}^{down} + C_i^{down}) - \frac{1}{2} \left( \frac{1}{m} \sum_{j=1}^m C_j^{pre} + \frac{1}{L} \sum_{k=1}^L C_k^{post} \right) \right]} \quad (13)$$

The resulting Equation (13) above may be implemented in software to solve for the flow rate, as further described in the Implementation and Equipment section below. Minimal user inputs are required; only the mass of $CO_2$ injected, the arrival of tracer gas background increase (or start time) and the decrease of tracer gas to initial background concentrations (or stop time) are required.

It should be noted that the linearization of concentration C and trapezoidal integration of such concentration C are assumptions that may be made and controlled in the experimental implementation. Further, trapezoidal integration is only one of a plethora of possible integration techniques widely known and used in the numerical analysis field, and was used here just to simplify the analytical form of Equation (13). By using alternative concentration C versus time functions and numerical integrations, other equations corresponding to Equation (13) may be realized and implemented. In fact, in preferred embodiments of the implementation, one may use a Simpson third or fifth order, or more accurate integration method. For exceedingly high accuracy, Gauss integration methods may be used to any desired order.

It should be further noted that, for uses of tracer gases not normally occurring in air, i.e. not carbon dioxide $CO_2$, that the pre-background concentration is zero, or $C^{pre}=0$; further simplifying Equation (13) accordingly.

Implementation and Equipment

This invention determines the leakage of in situ building ducts, which will typically be less than 5% for "tight" buildings (which have little leakage) or much higher, 20–30% for "leaky (and typically older)" buildings. A system therefore will need to have accuracy greater than 3% if leaks as small as 5% are to be detected.

In a typical implementation, there are two main components of the tracer gas system: an injector system, and a logging $CO_2$ (or other tracer gas) analyzer with software support.

FIG. 1A shows one embodiment of an injection system 100 that may be used to distribute the $CO_2$ or other tracer gas in the duct. The injection system 100 was designed to allow the implementation of the integration method described above, exemplified by Equation (13). The method requires that the mass of $CO_2$ injected be known. Among many possible pressurized gas containers, one implementation uses lightweight $CO_2$ tanks designed for paintball propulsion. Such tanks may be weighed before and after duct test injection to determine the mass of $CO_2$ injected during a duct testing operation. Pressurized tracer gas container 110 is fitted with a high-pressure valve 120 (which may be integral with the pressurized container), which in turn feeds through a valve system 130, 135 to a flexible bulk gas hose 140, to a break out juncture manifold 150, which in turn feeds one or more small diameter hoses 160, each of which terminate in a small diameter tube 170, which emits the tracer gas originating in the pressurized gas container 110. The small diameter hoses 160, each of which terminate in a small diameter flexible tube 170, may be collected into a bundle (not shown), and more easily inserted into a small bore hole in a duct. The small hole access to a duct allows for relatively easy insertion into extant building duct works without major invasive procedures. Subsequent to such insertion and testing, the small hole access through (typically) dry wall and duct are readily sealed.

The injector system 100 typically operates the high pressures (200–850 psig) in order to achieve the highest possible gas speed, possibly sonic, exiting the small diameter tube(s) 170. The high velocity imparts a high momentum to the $CO_2$ injection flow and causes the whips attached to the small diameter tube(s) 170 (readily implemented by hypodermic needles) to "dance" at a high frequency. As described above, the high velocity tracer gas injection induces turbulent mixing with the airflow in the duct, homogenizing the two into a uniform mixture.

The injector system 100 may be made using Luer-Lock fittings (or other similar fittings) with modified needles 170. The needles 170 may have thin Teflon tubing (acting as the small diameter hoses 160) attached to the ends that whip around in a random matter to distribute the $CO_2$ or other tracer gas evenly throughout the duct. The needles may also be quickly swapped out to a larger size for higher flows or to replace damaged needles. Each injector 100 may be equipped with a needle valve control so that independent flow rate adjustments are possible at each needle 170, or groups of needles 170. Furthermore, between valves 130 and 135 may be attached a plenum or manifold to implement one or more parallel sets 190 of needle groups, each comprising a duplicate of valve 135, flexible bulk gas hose 140, to a break out juncture manifold 150, which in turn feeds one or more small diameter hoses 160, each of which terminate in a small diameter tube 170, which emits the tracer gas originating in the pressurized gas container 110. Optional pressure gage 180 may be inserted to monitor the flexible bulk gas hose 140 pressure for any or all of the flexible bulk gas hoses 140. The pressure gage 180 may be mechanical, as drawn, or electrical for remote computer monitoring. Further, the valves 130, 135, may also be computer controlled actuating valves for remote operation with or without an operator. Additionally, each assembly comprising valves 130, 135, and pressure gage 180, may alternately be comprised of a mass flow controller, which may also be capable of either local operation or remote operation via computer control with or without an operator.

Figure 1B:
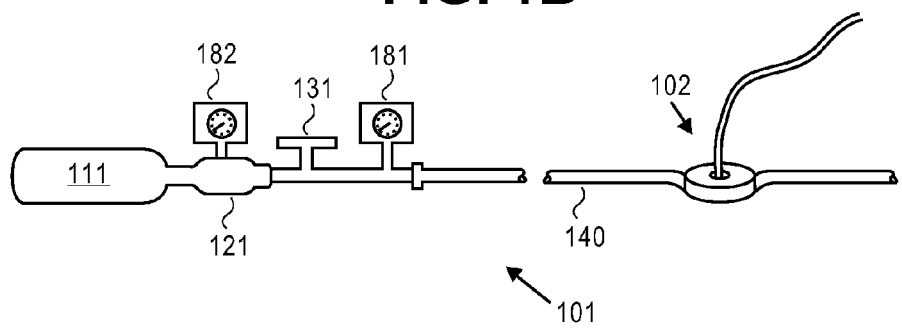
FIG. 1B is a schematic drawing of an alternate tracer gas injection system.
Figure 1C:
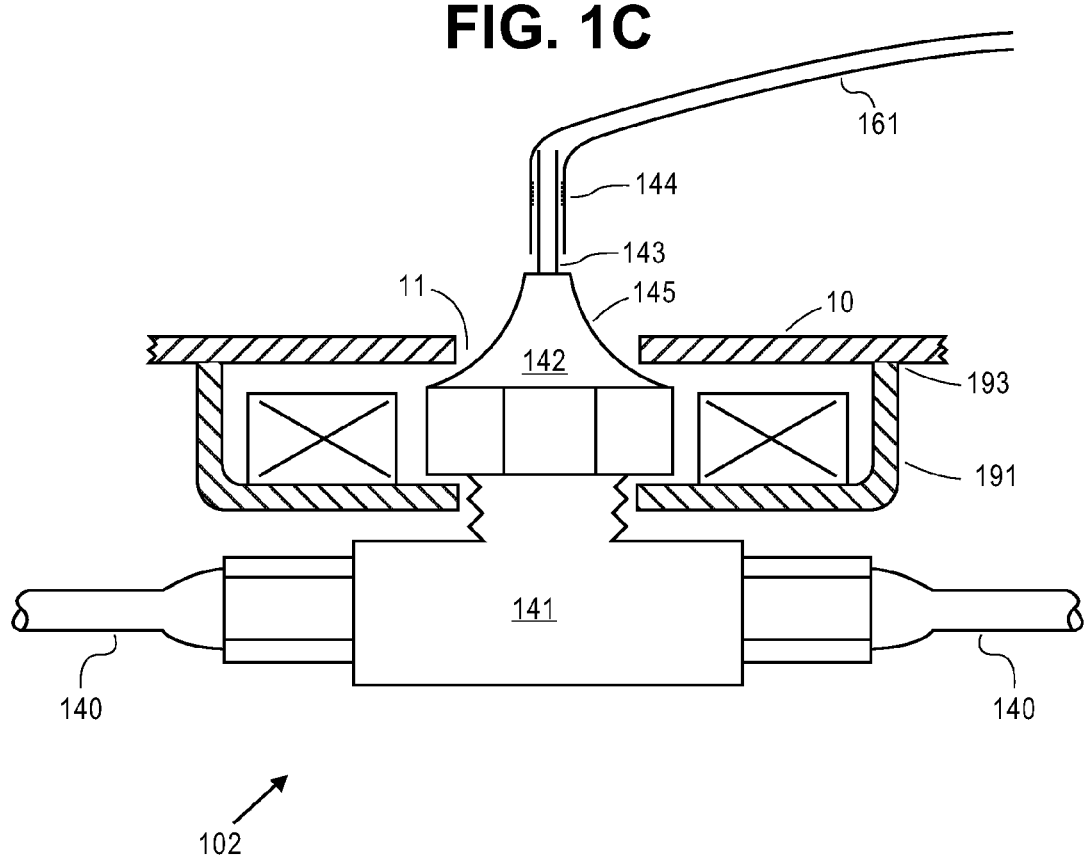
FIG. 1C is a walked cross-sectional view of an alternate injector 102 inserted in a duct.
Figure 1D:
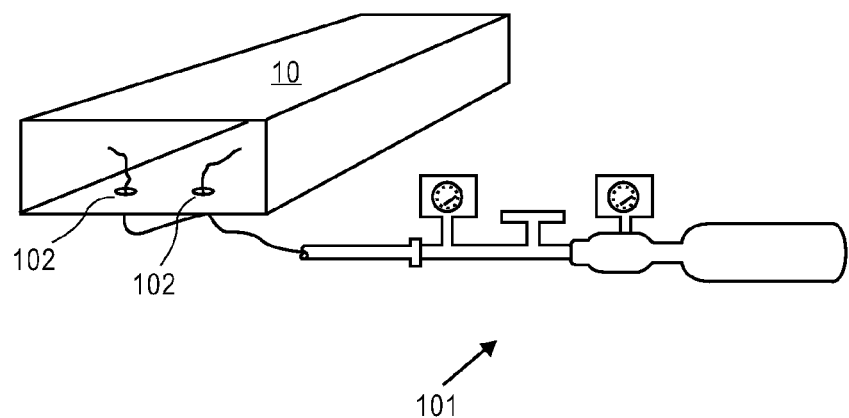
FIG. 1D is a perspective view of the alternate tracer gas injection system attached to a duct with two injection buds inserted into the duct.

An alternate embodiment of the injector system is depicted in FIG. 1B–1D. FIG. 1B shows an easily weighed pressurized tracer gas bottle 111 (such as for $CO_2$), which has either a detachable or integral valve 121. The valve 121 is connected to a supply pressure gage 181. An optional gas bottle pressure gage 182 is available for monitoring the tracer gas bottle 111 pressure. The valve 131 is located between gages 181 and 182, and is connected through flexible pressure resistant hose 140 to an alternate injector bud 102, more fully described in FIG. 1C.

FIG. 1C shows a partial cross sectional view of the alternate injector bud 102, where a flexible pressure resistant hose 140 allows tracer gas to enter into and out of fitting 141, which is shown as a T-type fitting. Should alternate injector bud 102 be the terminal one in a series, fitting 141 would instead be either capped off (not shown), or an L-type or straight in fitting (neither of which are shown). Fitting 141 is attached to a Vita fitting 142, which terminates in a soldered #22 gage diameter hypodermic needle 143, from Vita Needle Company, 919-T Great Plain Avenue, Needham, Mass. 02492. The Vita needle 143 is preferably soldered into the ferrule surrounding it in order to accommodate the high pressures applied to it. A flexible Teflon Alpha Wire #26 tube 161 is heat-shrink fitted (at 144) over the larger diameter #22 gage diameter hypodermic needle 143 via heating the Teflon (with a heat gun) until it sufficiently expands so that the tube interior diameter exceeds the outer diameter of the needle 143. Alpha wire #26 gage Teflon tubing heated with heat gun to expand inner diameter, then placed over #22 gage needle and allowed to cool as a heat shrink fitting. The Alpha Wire Company is located at 711 Lidgerwood Avenue Elizabeth, N.J.

The remainder of FIG. 1C shows a duct 10 cross-section having a hole 11 formed into it. The Vita fitting 142 is pressed into the hole 11 by the action of cylindrical magnet section 192, which causes a metal mounting cup 191 to seal to the duct 10 at contact 193. The magnet section 192 is preferably epoxied into the metal mounting cup 191, although in some applications, the magnetic field may be sufficient for retention. Vita fitting 142 acts as a retention mechanism for metal mounting cup 191.

In operation, the alternate injector bud 102 is brought close to the duct 10 hole 11, and the flexible Teflon Alpha Wire #26 tube 161 is fed through the hole 11 until the radiused surface 145 of the Vita fitting 142 is pressed into the hole 11. Some degree of care must be taken upon insertion to minimize damage to the soldered #22 gage diameter hypodermic needle 143. Magnetic forces, generated by magnet section 192, acts to removably hold the alternate injector bud 102 to the duct 10. It should be noted that the vast majority of commercial ducts 10 are comprised of magnetic galvanized steel, which is magnetically active.

FIG. 1D shows a perspective view of a section of duct 10 having two alternate injector buds 102 emplaced, and the remainder of the alternate injector system 101.

The number of needles and the configuration of the whips can be changed for different duct geometries. All of the components are attached together using machined ⅛ inch brass or stainless steel pipe fittings, flexible stainless steel braided line designed for high-pressure, and custom length high-pressure flexible plastic lines.

One example of a tracer gas concentration analyzer would be an Environment Gas Monitor (EGM), made by PP Systems, 110 Haverhill Road, Suite 301, Amesbury, Mass. 01913, USA. The EGM is a well-integrated $CO_2$ analyzer, which measures barometric pressure and temperature as well as the volumetric concentration of $CO_2$ in parts per million (ppm) corrected to standard temperature and pressure conditions. The EGM system, as supplied, had a small internal sample pump, however, a higher flow rate sample pump was added to increase the response time. The EGM was factory calibrated for a 0–1000 ppm range. The general background concentration for normal atmospheric $CO_2$ is approximately 400 ppm. In order to stay within the range of the analyzer, the injection rate must be adjusted to keep the total concentration below 1000 ppm. This means injecting sufficient $CO_2$ to increase the concentration by approximately 500 ppm.

A software system named TRAMS (an acronym for the Tracer-gas Airflow Measurement System) was developed to log and analyze the data. The software uses Microsoft Visual Basic™ and Microsoft Excel™ (of Microsoft, Redmond, Wash.) to collect and log the data, generate a plot during the experiment, and then analyze the collected data.

Uncertainty Analysis

There are potential sources of error for airflow measurements using this invention. Each error source may be evaluated to see its contribution to the overall uncertainty of the system. A preferred maximum allowable system error is 3%, so it is very critical to keep the individual error contributions low. The error analysis was performed according to the guidelines outlined by the American Society of Heating, Refrigerating and Air-Conditioning Engineers (ASHRAE) Guideline 2-1986 (RA96) and was found to be 0.26%. The low error bounds of the overall systems means that the overall system of injector, monitoring, and TRAMS software analysis (collectively, the TRAMS system) can yield extremely high accuracy average airflow measurements. The error analysis, however, requires a few assumptions that cannot be completely ignored. The background concentration, recirculation, timing, mixing, and the logging computers ability to acquire the data are all potential sources of error that cannot be quantified. For reference testing of the TRAMS system preferably requires a reference meter having an accuracy of greater than 1%.

Experimental Verification

To test TRAMS and the injector system capability of homogeneously mixing a duct flow with a tracer gas within a duct, a sample duct was constructed. The design of the experiment needed to provide an accurate means of measuring flow rate and prevent recirculation. A test duct was constructed from plywood, lay-flat tubing and cardboard. The injection for the TRAMS test was performed upstream in the duct, followed by a insertable foldable mixing fan to insure complete mixing and to test the theory described above. The injectors were then moved into the test box to the mixing in a more realistic configuration.

Figure 2:
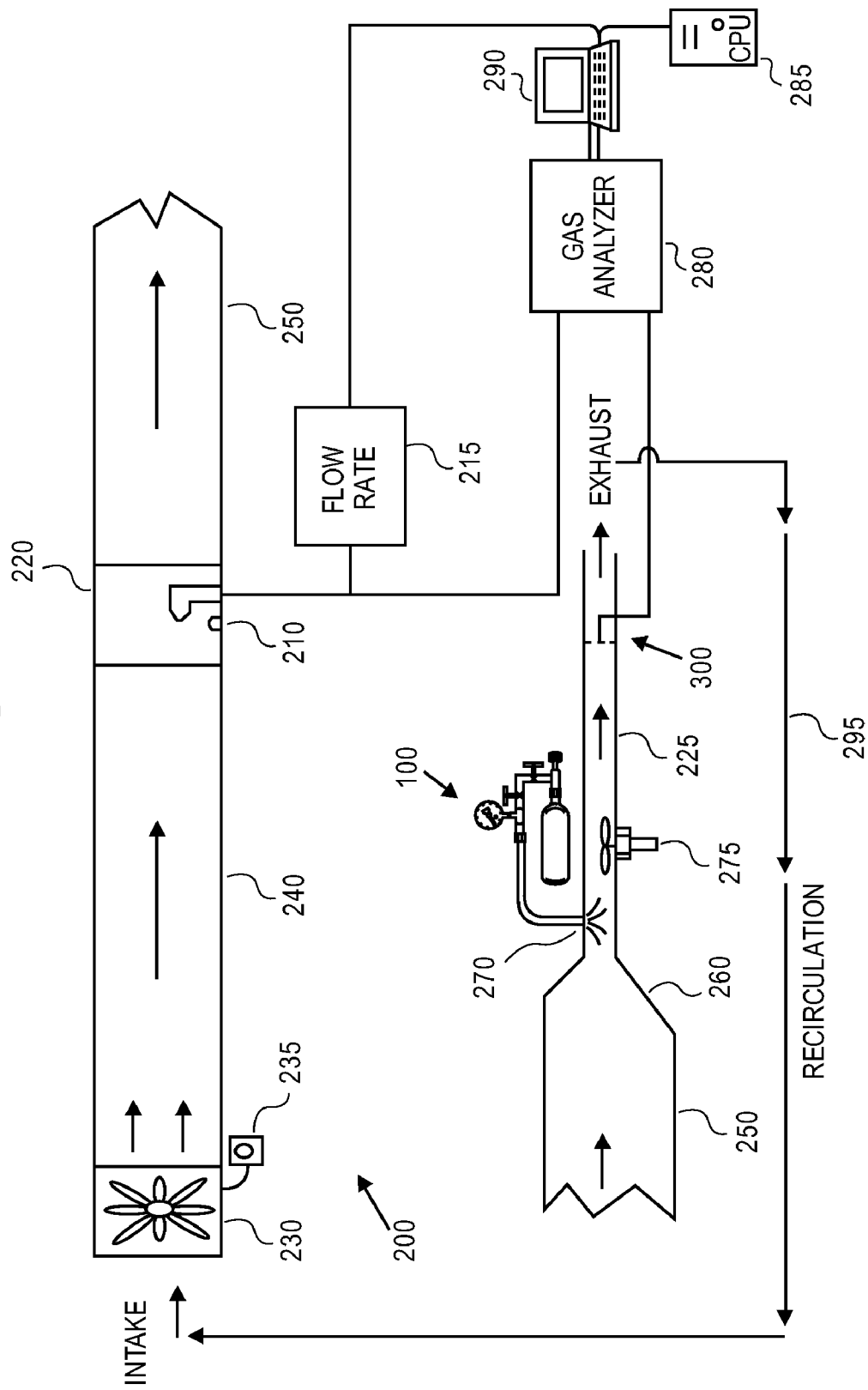
FIG. 2 is a schematic of an experimental setup for measuring duct flow with injection performed upstream of a fan for upstream mixing tests and result measurements.

Refer now to FIG. 2. In order to test the accuracy of TRAMS, an airflow test device 200 was constructed. A high accuracy reference device 220 was used to measure the airflow. It uses a plurality of Pitot tubes 210 in an array to measure airflow rates with 1% accuracy. The nozzle was attached 17-feet down stream of an input fan 230 with 40-inch Polyethylene lay-flat tubing 240. The outlet from the high accuracy reference device 220 was connected to the sampling section 225 with an additional 9 feet of lay-flat tubing 250 transitioning 260 to the sampling section 225.

The main fan 230 used was capable of 3000 cfm and was adjustable via a rheostat 235. The intake for the fan was positioned to suck outside air from an adjacent door. The exhaust was dumped into the opposite end of the room approximately 35-feet down stream, and evacuated with a blower-door (not shown) mounted in another adjacent doorway. This setup worked well for low flows, up to approximately 2000 cfm, and was limited by blower capacity from testing higher flow rates.

The sampling section 225 was a 1 by 3 by 8-foot rectangular duct made from plywood. One foot from the sampling section 225 exit a sampling rack 310 (now referring to FIG. 3) was added. The rack used 12 sampling tubes 320 uniformly distributed in the duct 225 to measure the tracer gas concentration throughout. The sampling tubes 320, exited through a small bore hole 320 to a 12-position rotary valve 330. The rotary valve connects one position to the gas analyzer 280, which acts as a sampling device, and the other 11 positions to a central port. Thus each of the sampling tubes 320 could individually be measured by the gas analyzer 280. An auxiliary pump (not shown) was added to keep fresh samples in the tubes that were not being sampled.

The data was logged using laptop (or desktop) computer 285 and recorded by hand in worksheets. The pressure data from the high accuracy reference device 220 was in turn sent to the high accuracy reference device controller 215, which was a 2-channel Automated Performance Testing System (APT), manufactured by The Energy Conservatory, 2801 21st Ave. South, Suite 160, Minneapolis, Minn. 55407, and recorded using TECLOG, software written for, and supplied with the APT. The data was converted to ASCII format and manipulated to provide the airflow rate and corrected to standard conditions. The airflow rate was added to the TRAMS software on the computer 285 and compared with the experimental results obtained by the TRAMS system.

In operation, the main fan 230 was controlled by rheostat (or other controller) to produce an air flow in lay-flat tubing 240, some distance away so as to damp small scale vortices and produce a flow that may be accurately sampled by the high accuracy reference device 220. Outlet sampled air from the high accuracy reference device 220 was in turn sent to the high accuracy reference device controller 215, and to the gas analyzer 280, to which both were connected to a computer data acquisition system 285. The air flow then continued through an additional 9 feet of lay-flat tubing 250 transitioning 260 to the sampling section 225, and transitioned 260 to the sampling section 225. Near the beginning of the sampling section 225 the injector system 100 (or alternate injector system 101) is shown inserted through a small bore access hole 270 which would be sealed about the injector system 100 small diameter tube(s) 170 for tracer gas injection. After the injector system, is an insertable folding mixing fan 400 (described further below). A sampling section 300 (described further below) monitored the flow intake and injected tracer gas concentrations through a selectable connection to the gas analyzer 280, displaying results of the testing on computer monitor 290.

It should be noted here that the test results described further below are for tracer gas injection system 100 as shown in FIG. 2 as it would normally be inserted into a commercial or residential duct. In such in situ applications, efforts would be made to insert the injector system 100 before a main fan 230 equivalent. Such insertion may even be possible at duct intake(s) at various points about a building under test, requiring no special placement of injector or sampler systems.

Upstream Mixing Tests

Figure 5:
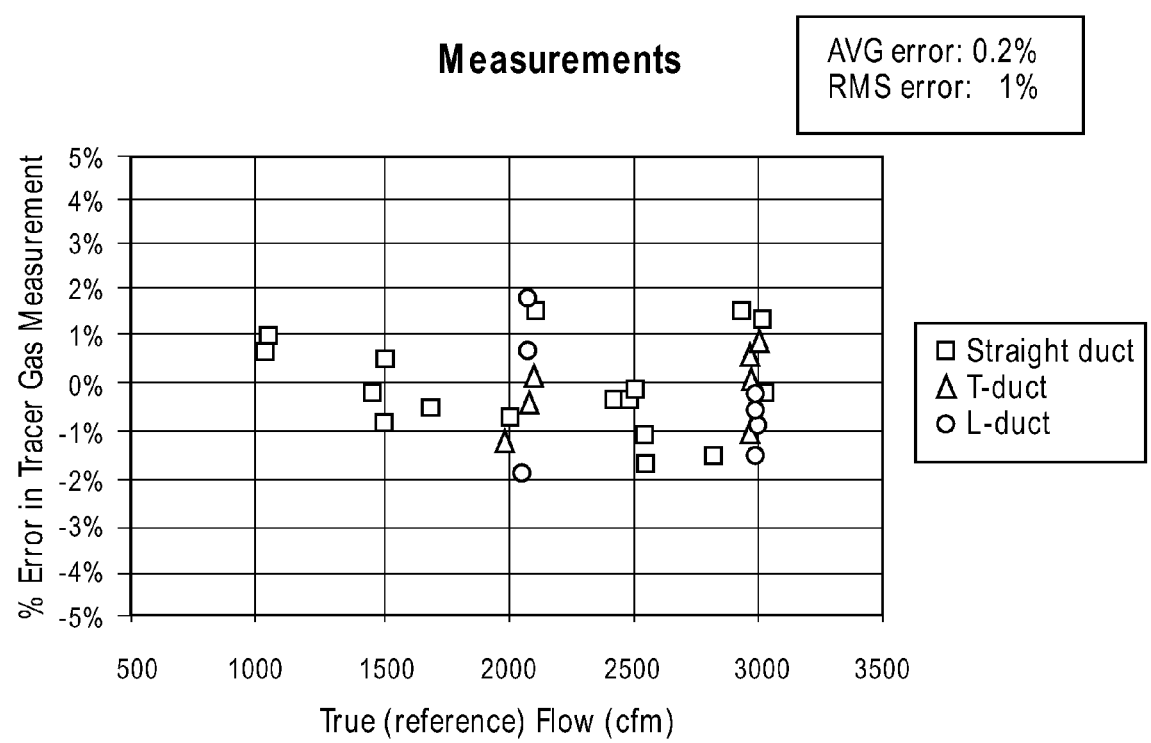
FIG. 5 is a graph showing typical errors of the TRAMS system in straight, T, and L-shaped ducts relative to a high accuracy flow measurement device, showing that the TRAMS error is bounded by 2%, averages 0.2% and has an RMS error of 1%.

Mixing tests were performed at various flow rates to test the TRAMS injector system 100. Initial test showed that the injection system required further development, so injection was performed upstream of the fan to aid mixing. With the TRAMS airflow test device 200 running the injection rate was monitored and adjusted to be between 900 and 1000 ppm. 20-ounce, or 7-ounce $CO_2$ tanks were used to maintain constant injection pressures and rates. The rheostat 235 on the fan 230 was set at each position and the airflow allowed to come to equilibrium. Both high accuracy reference device 220 and TRAMS data were recorded and fluctuations calculated. FIG. 5 is a graph showing typical errors of the TRAMS system in straight, T, and L-shaped ducts relative to a high accuracy flow measurement device, showing that the TRAMS error is bounded by 2%, averages 0.2% and has an RMS error of 1%. Straight ducts are common linear ducts. The T, and L-shaped ducts resemble the letters of the alphabet, with the T having a juncture of one branch leaving from a section of straight duct. The L duct is similarly a straight duct with a 90° bend in it.

Figure 3A:
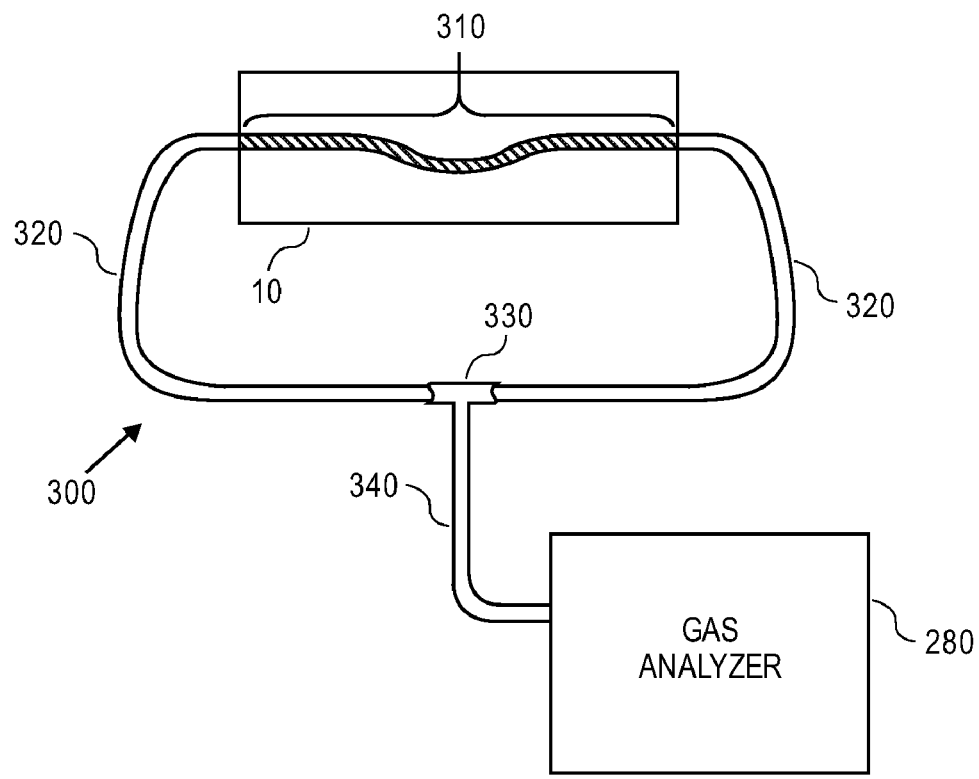
FIG. 3A is a drawing of a sampling hose traversing a horizontal duct T-ed to a gas analyzer.

Referring now to FIG. 3A, a sampler 300 is shown sampling duct 10. Here, a sampling tube 310 comprising a perforated hose, is suspended roughly across the midsection of duct 310. Non-perforated tube 320 connects to the sampling tube 310 at either end, and connects the sampled gas through a T fitting 330 to additional non-perforated tube 340 to a gas analyzer 280. The perforated hose may be as simple as home and garden store purchased soaker hose, a section of Gore-Tex stretched Teflon tubing, a laser perforated hose (as is typically used in drip irrigation systems), a mechanically perforated hose, and an injection molded perforated hose.

Figure 3B:
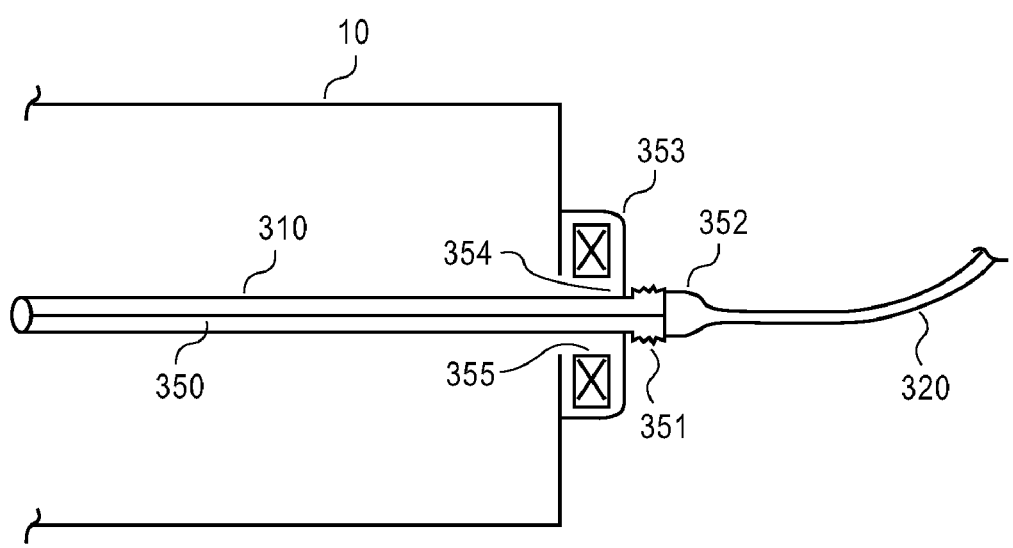
FIG. 3B is a partial cross-sectional view of a self supported sampling hose magnetically mounted to a duct section.

Referring now to FIG. 3B, the perforated hose 310 may contain an internal support 350 retained by hose fixtures 351 and 352. Connection to the duct 10 may be obtained by a magnet cup 353 containing a ring magnet 355. Retaining nut 354, retains the magnetic cup 353 to the hose fixtures 351 and 352.

Obvious alternative sampling tubes would include, but not be limited to, a perforated rigid tube magnetically attached to duct 10, adhesively attached, or mechanically attached. The perforated hose 310 may be rigid or flexible. If flexible, then the hose would preferably be emplaced in the duct 10 in a condition of tension so as to retain a desired sampling location.

Figure 4:
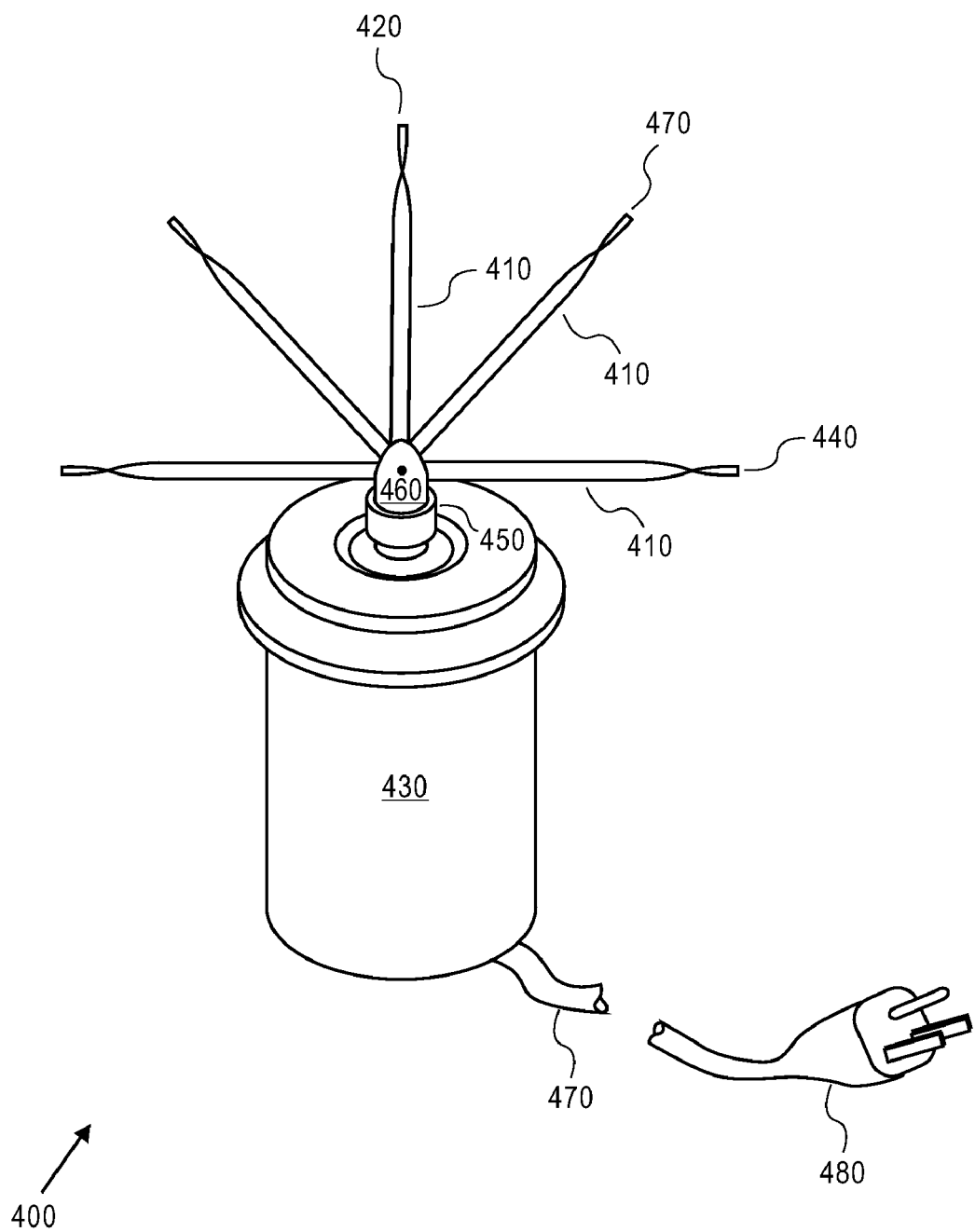
FIG. 4 is a perspective insertable retractable mixing fan in various angles of fan blade deployment.

FIG. 4 shows an insertable foldable mixing fan 400 in various angles of fan blade 410 deployment. Upon insertion, the fan blades 410, which are designed to be rotationally balanced (that is two, three, four, etc. blades of equal or balanced mass distribution) are in an upright position 420, roughly aligned with the axis of rotation of the driving motor 430. Upon unconstrained rotation, blades deploy to a nominal direction 440 perpendicular to the axis of rotation. Adjustable constraint 450 may be positioned up or down the spinning shaft 460 to act as a deployment stop, allowing only partial deployment 470 (here shown to be about 45°). The driving motor 430 is connected to a power source (unshown) through a wire 470 to a connector 480 (shown for illustrative purposes only). The driving motor 430 may be controlled by a simple Variac, or a more sophisticated motor controller to allow the blades 410 to readily deploy without destruction. A preferred maximum rotation speed of the driving motor 430 is about 8000 RPM.

In application, the insertable foldable mixing fan 400 blades 420 and is placed through a small access hole in the duct (unshown in this view), as is the topmost part of the spinning shaft 460, until magnetic mount 490 seals any gaps and temporarily mounts the entire insertable foldable mixing fan 400 to the duct. The driving motor 430 is slowly ramped up to speed to allow the blades 410 to deploy to their operating positions, and the driving speed increased to full operating speed.

It has been found that, with the insertable foldable mixing fan 400 operating downstream of the injector systems 100 or 101, that full mixing of tracer gas and bulk air flow occurs in about two hydraulic diameters of the duct. Multiple insertable foldable mixing fans 400 may be used in large ducts, with blade lengths varied accordingly. For circular ducts, either a cylindrical magnet 490 assembly may be made, or a magnetic cylindrical adapter placed between the magnet 490 and the duct. Additionally, three insertable foldable mixing fans 400 may be placed equidistant about the circular cross section to allow for complete mixing.

The sampling rack 310 was used to collect this data. Data was recorded for 8 seconds at each location.

FIGS. 5–8 are concentration versus time plots of $CO_2$ concentrations versus time in seconds for various test configurations. In each of these plots, a bounded quadrilateral (typically near rectangular, except for FIG. 8) that represents the average of the increase of tracer gas (here $CO_2$) detected in excess and over the background concentration.

Figure 6:
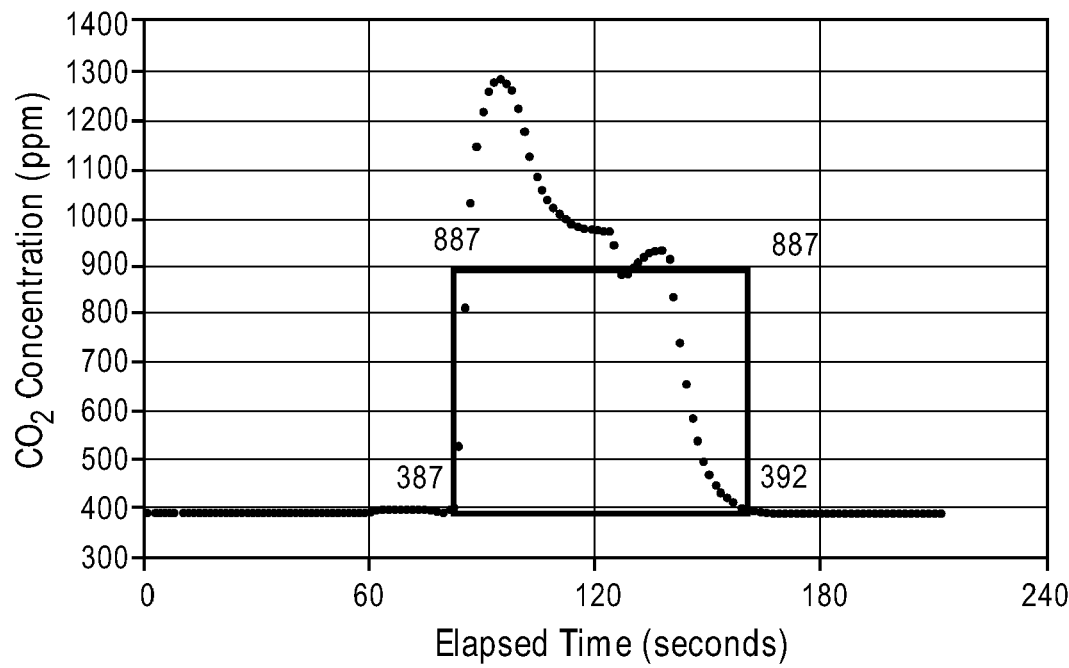
FIG. 6 is a graph illustrating the accuracy of the TRAMS invention described herein, where, with no recirculation $Q_{measured}$=1484 cfm, $Q_{reference}$=1488 cfm, yielding a percentage error of only −0.3% even though the injection rate was not constant.

FIG. 6 is a graph illustrating the accuracy of the TRAMS invention described herein, where, with no recirculation $Q_{measured}$=1484 cfm, $Q_{reference}$=1488 cfm, yielding a percentage error of only −0.3% even though the injection rate was not constant.

Figure 7:
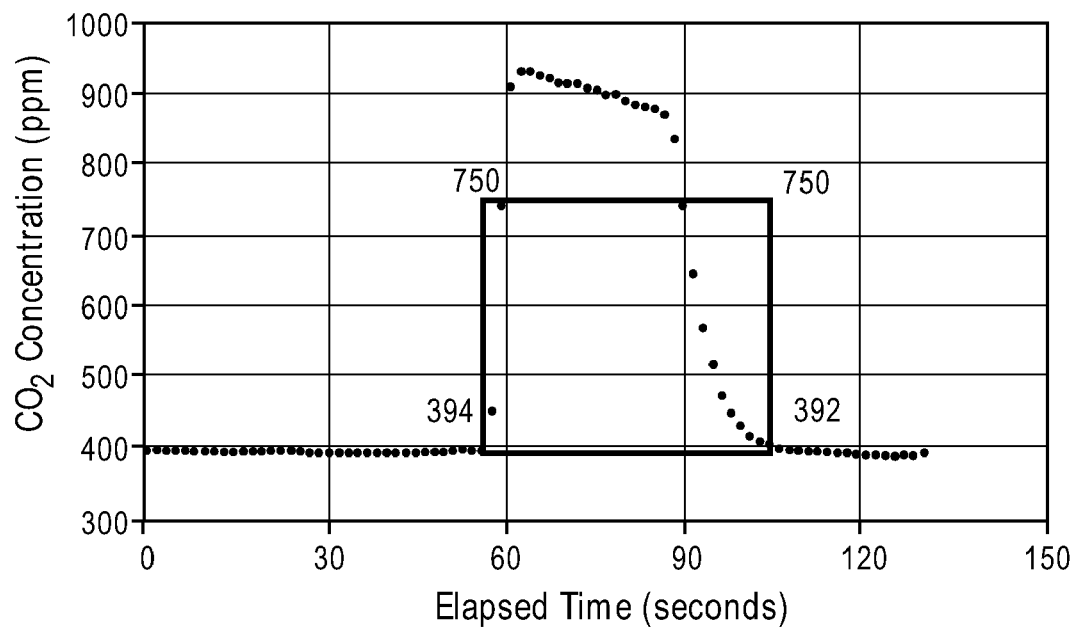
FIG. 7 is a graph illustrating the accuracy of the TRAMS invention described herein, where, with no recirculation $Q_{measured}$=2922 cfm, $Q_{reference}$=2932 cfm, yielding a percentage error of only −0.4%. In this test, the injection time was reduced to prevent recirculation. The results show good agreement with the reference meter.

FIG. 7 is a graph illustrating the accuracy of the TRAMS invention described herein, where, with no recirculation $Q_{measured}$=2922 cfm, $Q_{reference}$=2932 cfm, yielding a percentage error of only −0.4%. In this test, the injection time was reduced to prevent recirculation. The $Q_{reference}$ results show good agreement with the high accuracy reference device 220.

Figure 8:
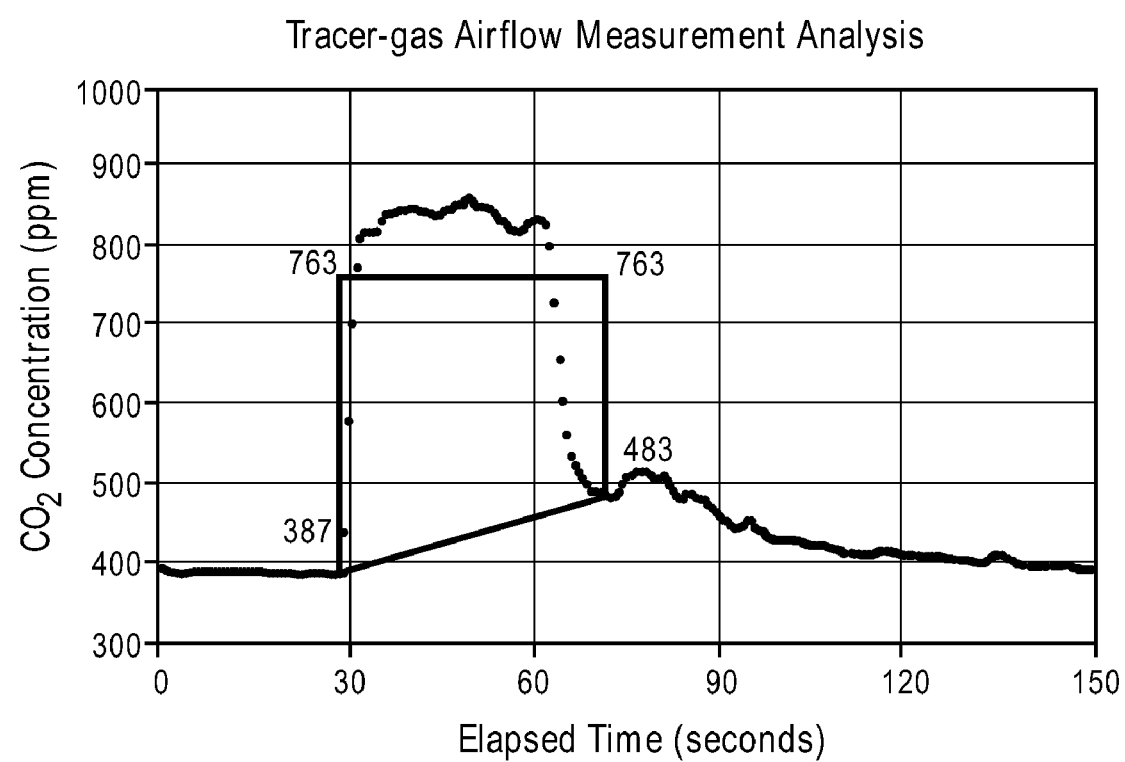
FIG. 8 is a graph illustrating the accuracy of the TRAMS invention described herein, where, with recirculation $Q_{measured}$=3000 cfm, $Q_{reference}$=2887 cfm, percent error=3.8%, showing that the linear approximation for the increase in background concentration is not valid when recirculation is present.

FIG. 8 is a graph illustrating the accuracy of the TRAMS invention described herein, where, with recirculation $Q_{measure}$=3000 cfm, $Q_{reference}$=2887 cfm, percent error= 3.8%. These results show that the linear approximation for the increase in background concentration is not valid when recirculation is present. To measure the airflow rate under these conditions two $CO_2$ analyzers would be needed, one prior to tracer gas injection by the injection system 100, and another one after homogenous mixing of the tracer gas and bulk gas. The results from the mixing test show that injecting upstream of the fan results in complete mixing and allows the TRAMS system to be tested using the same apparatus. This is important because without complete mixing air flow rate measurements cannot be as repeatable and accurately performed.

TABLE 1

Results

| Test # | Injection Period (seconds) | Mass Injected (grams) | Average Concentration Rise (ppm) | Q Calculated (cfm) | Q Reference (cfm) | % Error | Test Conditions |
|---|---|---|---|---|---|---|---|
| 1 | 70.4 | 39.1 | 765 | 841 | 836 | 0.6 | no recirculation, high concentration |
| 2 | 78.8 | 50.6 | 498 | 1494 | 1488 | 0.4 | no recirculation |
| 3 | 120.2 | 59.76 | 383 | 1503 | 1509 | −0.3 | no recirculation |
| 4 | 48.1 | 43.26 | 396 | 2918 | 2932 | −0.5 | short injection time, no recirculation |
| 5 | 51.3 | 43.2 | 357 | 2941 | 2951 | −0.3 | short injection time, no recirculation |

TABLE 2

| Test # | Injection Period (seconds) | Mass Injected (grams) | Average Concentration Rise (ppm) | Q Calculated (cfm) | Q Reference (cfm) | % Error | Test Conditions |
|---|---|---|---|---|---|---|---|
| 6 | 97.6 | 30.34 | 407 | 885 | 911 | −2.9 | recirculation |
| 7 | 136.3 | 88.55 | 341 | 2209 | 2189 | 0.9 | some recirculation/ high infiltration |
| 8 | 89.7 | 82.61 | 357 | 2987 | 2892 | 3.2 | recirculation/ infiltration |
| 9 | 102.5 | 87.2 | 329 | 3000 | 2887 | 3.8 | recirculation/ infiltration |
| 10 | 113.9 | 94.4 | 315 | 3047 | 2883 | 5.4 | recirculation |
| 11 | 35.3 | 80.26 | 881 | 2993 | 2954 | 1.3 | maximum injection rate w/#22 needles, concentration outside of calibrated range. |

Table 1 presents results from the TRAMS measurement experiments with no recirculation. Injection was performed upstream of the fan. The results are promising, indicating that the system may be used to accurately measure duct leakage.

Table 2 presents the results with recirculation. Recirculation (shown in FIG. 2 pictorially as tracer gas flow 295) means gas from the intake side of the input fan 230 traveling through the fan to its exhaust, then returning to the intake side, typically taking a route within the structural volume where testing is being done. The majority of error is introduced by the implicit assumption that the background $CO_2$ concentration will increase linearly with tracer gas $CO_2$ addition. Referring to FIG. 7, one may see that the tracer gas injection ended at about 160 seconds, however, the recirculation continued for an additional 80–100 seconds. From tests of this nature it appears that the recirculation/infiltration pattern is not linear.

The results for the TRAMS measurement test are presented in table 2. For test with little pre and post background variations the system agreed with the reference meter within 1%. On tests with recirculation and infiltration the system error was greater than 3% and as high as 7%. Tests were also performed with different injection periods and with constant or varied injection rates. Representative tests have been presented in FIGS. 5 through 7. The tests also show that there is no increase in relative error as the airflow rate increases, which agrees with the uncertainty analysis done above.

Conclusions

All of the airflow rates were converted to standard conditions for comparison purposes. The TRAMS analysis automatically provides results in standard conditions, but the reference meter required the results be converted. From the results, it shows that TRAMS works as designed when the background $CO_2$ concentration is constant. The error for tests with a purged injector, and no recirculation consistently show less than 1% deviation from a high accuracy reference meter. If infiltration and recirculation occur, however, the flow measurements are less accurate, and could not be used to measure very small duct leakage flow rates. This is not a concern, however, when it comes to making measurements in a large office building, since injection time durations may be shortened to be less than the recirculation time. In the small trailer where the system was tested, the recirculation time was short, on the order of 30 seconds. Such a case would be considered a worse case scenario.

The results also show the robustness of the integration method for dealing with inconsistent injection rates. The experimental error was nearly the same for test with varied or constant injection rates (test 1–3 of Table 1). The system also produces accurate measurements with short injection times (test 12, 13 of Table 2). This is a valuable fact that may be advantageously used to eliminate recirculation errors.

All publications, patents, and patent applications mentioned in this specification are herein incorporated by reference to the same extent as if each individual publication or patent application were each specifically and individually indicated to be incorporated by reference.

The description given here, and best modes of operation of the invention, are not intended to limit the scope of the invention. Many modifications, alternative constructions, and equivalents may be employed without departing from the scope and spirit of the invention.

We claim:

1. A method for measuring fluid flow, the method comprising the steps of:
    a) injecting an amount of a tracer into a bulk fluid flow, said flow having an upstream and downstream;
    b) detecting a concentration of the injected flow tracer mixed with said bulk fluid flow at a distance downstream;
    c) mixing the bulk fluid flow and tracer with an insertable foldable mixing fan; and
    d) calculating the bulk fluid flaw from the injected tracer amount and the detected tracer concentration.

2. The method of claim 1 further comprising the step of controlling the insertable foldable mixing fan with a fan speed controller, whereby said fan speed controller may be used to increase fan speed at a level below that of damaging the insertabie foldable mixing fan.

3. The method of claim 1 wherein said detecting step further comprises flue steps of:
    a) inserting a perforated sampler hose into said bulk fluid flow and tracer mixture;
    b) sampling said perforated sampler hose to detect said concentration of injected flow tracer.

4. The method of claim 3 wherein said perforated sampler hose is selected from a group consisting of: a section of soaker hose, a section of Gore-Tex stretched Teflon tubing, a laser perforated hose, a mechanically perforated hose, and an injection molded perforated hose.

5. The perforated sampler hose of claim 4 wherein said perforated sampler hose cross section is selected from a group consisting of: round, oval, rectangular, triangular, quadrilateral, and irregular.

6. The method of claim 1, wherein said bulk fluid is air.

7. The method of claim 1, wherein said bulk fluid is a gas.

8. The method of claim 1, wherein said bulk fluid is a liquid.

9. The method of claim 1, wherein said calculating step comprises:

$$\text{integrating } Q_{bulk}^{ave} = \frac{m_{tracer}}{\rho_{tracer} \int_0^T (C^{down} - C^{up}) dt}$$

for the average bulk fluid flow $Q_{bulk}^{ave}$ given:
    said tracer mass injected $m_{tracer}$,
    said tracer density $\rho_{tracer}$,
    a sample time T,
    a set of samples of detected downstream concentrations $C^{down}$,
    a set of samples of detected upstream concentrations $C^{up}$.

10. The method of claim 1, wherein said injecting step further comprises measuring the mass flow rate of tracer injection.

11. The method of claim 1, wherein said injecting step further comprises controlling the mass flow rate of tracer injection.

12. The injector system performing injecting step of claim 1, wherein said injector system comprises:
    a) a pressurized tracer gas source;
    b) a valve connected to said gas source;
    c) one or more flexible tubes having a distal and proximal end, said proximal end connected to said valve; and
    d) a smaller diameter tube in the distal end of each flexible tube,
    e) whereby said pressurized gas flows from the gas source, through the valve, through one or more flexible tubes, and through the smaller diameter tube, to exit the smaller diameter tube.

13. The method of claim 1, wherein said injecting step further comprises homogenizing said bulk fluid with said tracer to an essentially well-mixed state.

14. The method of claim 1, wherein said tracer is selected from the group consisting of: carbon dioxide, water vapor, argon, xenon, helium, and sulfur hexafluoride.

15. The method of measuring fluid flow of claim 1 comprising:
    a) detecting an initial concentration of carbon dioxide in the bulk fluid flow in the upstream of a duct, said bulk fluid flow in the duct.

16. The method of measuring fluid flow of claim 15 wherein said tracer comprises carbon dioxide and said bulk fluid is air.

17. The method of measuring fluid flow of claim 16 wherein said injecting step injects a known amount of carbon dioxide into said upstream for a period of time.

18. The method of measuring fluid flow of claim 17 wherein said calculating step comprises:
    a) detecting the downstream concentration of carbon dioxide in said flow; and
    b) means for calculating said fluid flow using said initial concentration, said known amount and said downstream concentration.

19. The method of measuring fluid flow of claim 18 wherein said means for calculating comprises a computer.

20. The method of measuring fluid flow of claim 1 wherein said detecting step is achieved by a mass spectrometer.

21. The method of measuring fluid flow of claim 1 wherein said detecting step is achieved by a residual gas analyzer.

22. The method of measuring fluid flow of claim 15 wherein said injecting step further comprises:
    a) inserting an injector into said upstream flow; and
    b) releasing pressurized carbon dioxide at high velocity from one or more ends of compliant distribution tubes movement-contained within said duct.

* * * * *